United States Patent
Wigsten

(10) Patent No.: US 6,302,816 B1
(45) Date of Patent: Oct. 16, 2001

(54) CHAIN GUIDE OR TENSIONER ARM WITH SHEET METAL BRACKET AND ALTERNATING TABS

(75) Inventor: Mark Wigsten, Lansing, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/519,792

(22) Filed: Mar. 7, 2000

(51) Int. Cl.$^7$ .................................................. F16H 7/08
(52) U.S. Cl. .......................................... 474/111; 474/140
(58) Field of Search ..................................... 474/101, 111, 474/140; 248/223.41, 228.1, 228.2

(56) References Cited

U.S. PATENT DOCUMENTS

| | | | |
|---|---|---|---|
| 4,674,723 | * 6/1987 | Bayuk | 248/246 |
| 4,832,664 | 5/1989 | Groger et al. | 474/111 |
| 5,045,032 | 9/1991 | Suzuki et al. | 474/140 |
| 5,109,992 | * 5/1992 | Miller | 211/59.1 |
| 5,286,234 | * 2/1994 | Young | 474/111 |
| 5,665,019 | * 9/1997 | Sheffer et al. | 474/111 |
| 5,690,569 | 11/1997 | Ledvina et al. | 474/111 |
| 5,711,732 | * 1/1998 | Ferenc et al. | 474/111 |
| 5,720,682 | 2/1998 | Tada | 474/91 |
| 5,755,034 | * 5/1998 | Yasue et al. | 29/896.62 |
| 5,776,024 | * 7/1998 | White et al. | 474/110 |
| 5,779,582 | 7/1998 | Mott et al. | 474/140 |
| 5,806,820 | * 9/1998 | Simon | 248/243 |
| 5,813,935 | 9/1998 | Dembosky et al. | 474/111 |
| 5,853,341 | 12/1998 | Wigsten | 474/140 |
| 5,967,922 | * 10/1999 | Ullein et al. | 474/111 |
| 6,095,938 | * 8/2000 | Kumskurz | 474/111 |

FOREIGN PATENT DOCUMENTS

| | | | |
|---|---|---|---|
| 3525746 | * 1/1987 | (DE) | F16H/07/08 |
| 58-178043 | * 10/1983 | (JP) | F16H/07/18 |
| 58-200841 | * 11/1983 | (JP) | F16H/07/08 |

* cited by examiner

Primary Examiner—David A. Bucci
Assistant Examiner—Vicky A. Johnson
(74) Attorney, Agent, or Firm—Sidley Austin Brown & Wood; Greg Dziegielewski

(57) ABSTRACT

A guide or tensioner arm including a bracket made from a formed sheet metal stamping. The bracket is formed of a body portion with a series of tabs formed along a bottom edge. The tabs are bent perpendicular to the body portion of the bracket in an alternating fashion. This forms a bracket having a T-shape providing a flat base for mounting a plastic shoe. Since the body portion is centered with respect to the alternating tabs a strong bracket for holding the plastic shoe is provided to guide or tension an associated strand of chain in a power transmission system.

7 Claims, 3 Drawing Sheets

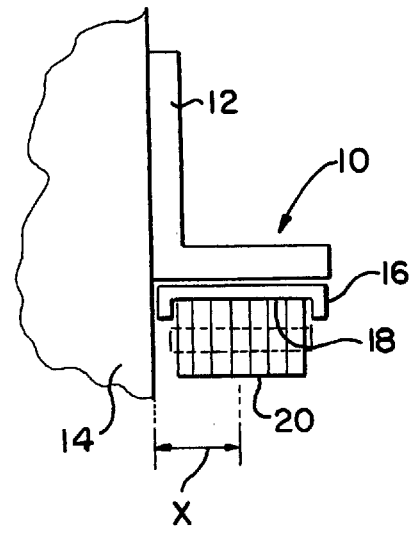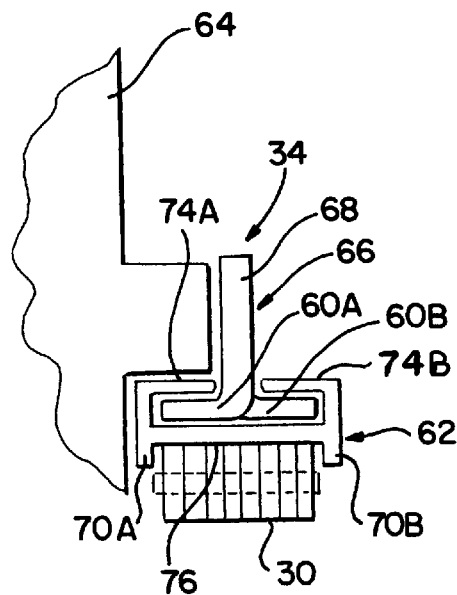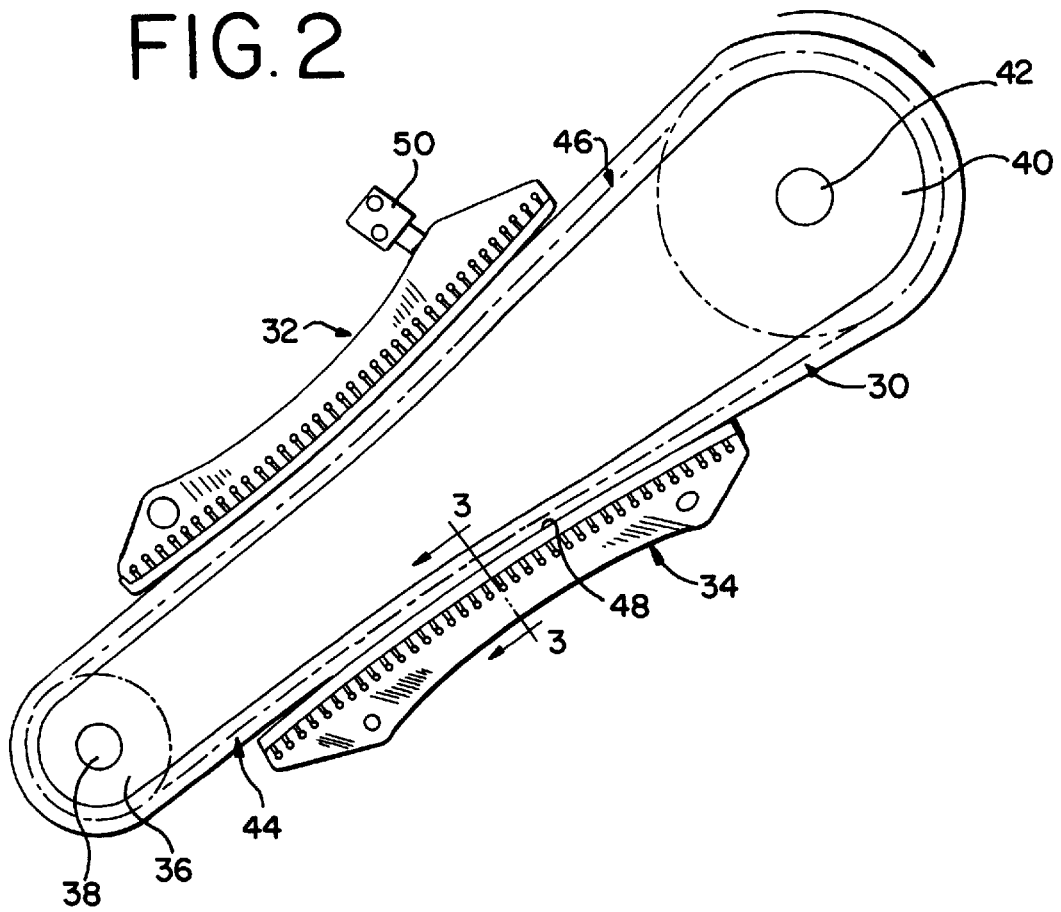

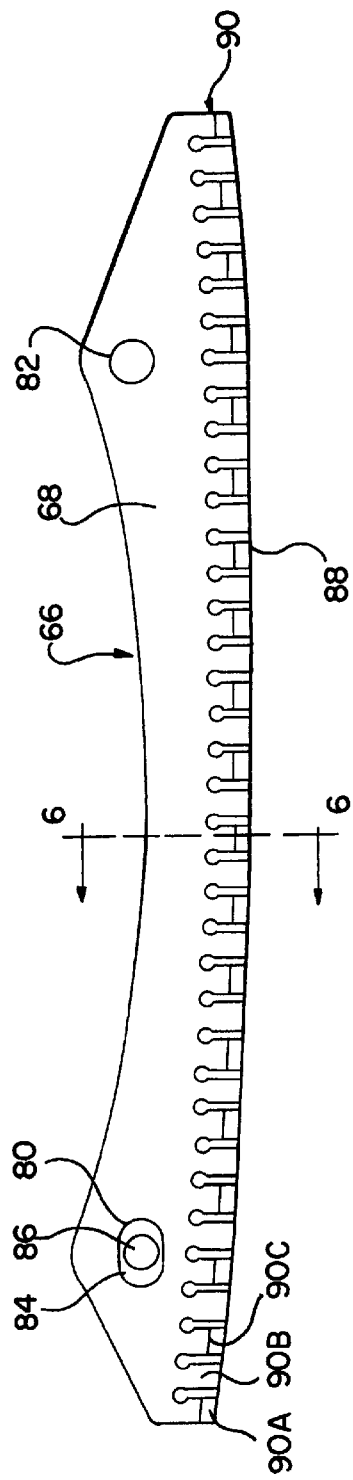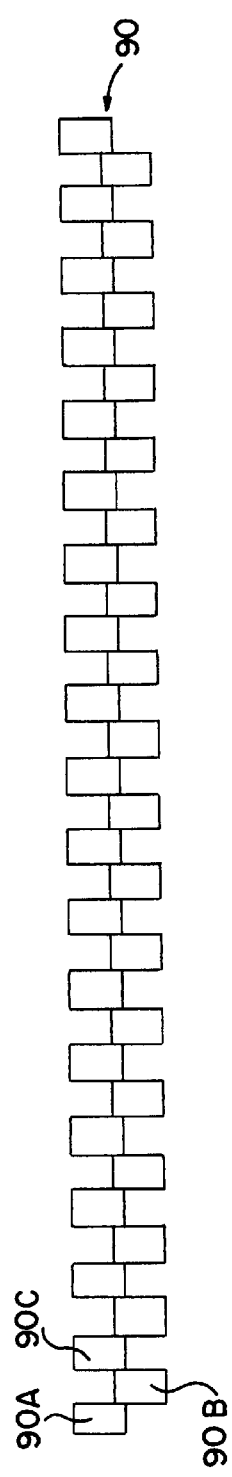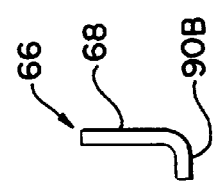

CHAIN GUIDE OR TENSIONER ARM WITH SHEET METAL BRACKET AND ALTERNATING TABS

BACKGROUND OF THE INVENTION

The present invention relates generally to a guide rail or tensioner arm for guiding or tensioning a drive chain and more particularly to a sheet metal bracket with tabs formed on one edge which are bent in alternate directions for engagement with a plastic shoe or wear face. The guide rails or tensioner arms of the preferred embodiment of the present invention are designed for use as chain guides or tensioner arms in power transmission systems and engine timing systems using chain to drivingly connect the elements of the system.

Conventional engine timing systems include a crankshaft and a corresponding sprocket system which operates an engine with either a single or dual overhead camshafts. The operation of the system is based upon a chain which extends from the crankshaft to the camshaft (or camshafts) and returns to the crankshaft in an endless loop. Rotation of the crankshaft and the chain causes the camshaft to rotate.

Examples of engine timing systems are shown in U.S. Pat. No. 5,427,580, which is incorporated herein by reference. As the chain extends in an endless loop between the driving and the driven sprockets, such as those located on a crankshaft (driving) and camshaft (driven), the chain forms a "tight" side and a "slack" side. The tight side is formed by the tension in the span of chain between the links entering the driving sprocket and the links leaving the driven sprocket. A slack side is formed on the other span of chain between the links leaving the driving sprocket and entering the driven sprocket.

The performance and action of the chain can differ dramatically between the tight and slack sides. A chain tensioner is conventionally used on the slack side of the chain. The tensioner acts to take up or eliminate the slack in the chain. As the engine accelerates or decelerates, the tensioner arm may move closer to the chain to maintain the tension, i.e., reduce the slack in the chain. The tensioner arm typically includes a convex surface to match the path of the chain.

In contrast, a chain guide is conventionally used on the tight side of the chain. Such a guide does not include a tensioner piece, as the chain portion remains tight between the two sprockets. Typically, the guide is fixed to a mounting surface, such as a side of the engine block. The guide serves to maintain the desired path of the chain between the sprockets.

Conventional guide rails of the prior art may be formed as a single piece but more typically include two components, a bracket or carrier and a plastic shoe or wear face, that are produced independently of one another and interconnected by some form of locking device. The bracket may be made of metal or plastic and the wear face or shoe is typically made of plastic.

U.S. Pat. No. 4,832,664 discloses a guide rail that includes a carrier formed of a first plastic material and a slideway lining body made of a second different plastic material. Each of these two components is formed in a mold. The carrier and slideway lining body are interconnected to one another by dovetail connections, and secured by bent end sections. In the chain guide shown in U.S. Pat. No. 4,832,664, the carrier and sliding guideway body are formed on complementary dovetail cross-sections, and interlocked by the bent end section, or a similar meshing arrangement, that prevent relative movement between the two portions.

U.S. Pat. No. 5,813,935 discloses a guide rail where the wear face is produced by an extrusion molding process. The extrusion molding process is used in place of injection molding to permit the use of dovetail connections and provide interlocking components. The carrier portion is substantially an I-shape in cross-section with an extending dovetail section. The dovetail section on the carrier fits a complementary dovetail cross-section formed in the wear face. The carrier portion may be manufactured of die cast aluminum or magnesium; injection molded nylon; steel stamping; steel casting; or, steel or aluminum weldment.

Prior art brackets for chain guides, when made of metal, have often been formed with the bracket mounted to the engine at a location away from the chain centerline. FIG. 1 shows such a chain guide. The bracket is L-shaped in cross-section One side of the bracket 12 is mounted to an engine block 14 and the other side of the bracket 12 includes an attached shoe 16 with a channel shaped wear face 18. The chain 20 passes along the channel shaped wear face 18. The load applied to the bracket 12 by the chain 20 acts through distance "X" applying a stress to the bracket. To prevent the bracket 12 from bending or failing due to the stress, a bracket of thick material is used or an expensive stronger material is used.

The guide or tensioner arm of the present invention includes a carrier or bracket made from a formed sheet metal stamping. On a longitudinal edge of the bracket a series of extending tabs are formed. The tabs are bent perpendicular to the main body of the bracket in an alternating fashion. This forms a bracket which has a T-shape providing a base for mounting a plastic shoe with a wear face for guiding a chain.

SUMMARY OF THE INVENTION

The present invention is primarily concerned with a bracket or carrier for a tensioner shoe. The carrier and shoe is used as a chain guide or pivoting tensioner arm and may be applied to a power transmission system or engine timing system using a chain to drivingly interconnect driving and driven members.

In accordance with one embodiment of this invention, a chain guide is formed of two main interlocking parts. A first part includes a bracket. The bracket is formed of an initially flat, elongated stamped metal plate. The bracket has a pair of spaced holes.

Along one longitudinal edge of the bracket are formed a row of extending tabs. The tabs are defined by a series of slots formed in the edge of the bracket. The slots may originate from a row of holes formed in the bracket and extend to the longitudinal edge of the bracket. After the plate is stamped, the tabs are bent to a position perpendicular to the plane of the main body of the bracket. The tabs are bent in an alternate manner to each side of the bracket to form a T-shaped carrier member. The present invention contemplates the formation of 20–40 tabs, i.e., 10–20 tabs on each side of the bracket centerline.

The second part includes a plastic shoe having a wear face. The wear face has a channel formed therein to engage an associated chain. Opposite the wear face is a side which is adapted to engage the bracket. A series of hook-shaped tabs engage the tabs on the bracket. A retaining hook engages an end tab on the bracket to keep the shoe fixed to the bracket.

The assembly of the carrier and the shoe forms a chain guide which is typically applied to the tight strand of a power transmission chain.

Similar to the chain guide described above, a second embodiment of the present invention includes a chain tensioner arm having two main interlocking parts. A first part is a bracket as described in the first embodiment which further includes a hole optionally fitted with a bushing which is rotatably attached to a fixed pivot pin. The pivot pin is attached to the engine. A plastic shoe or the like is attached to the bracket. A chain tensioner is positioned to bear upon the bracket to cause the tensioner arm to tension a slack strand of the chain.

For a further understanding of the present invention and the objects thereof, attention is directed to the drawing and the following brief description thereof, to the detailed description of the preferred embodiment of the invention and to the appended claims.

BRIEF DESCRIPTION OF THE DRAWINGS

FIG. 1 is a sectional view of a prior art guide bracket and wear face illustrating the position of the chain and shape of the bracket.

FIG. 2 is a side view of the tensioner arm embodiment and the chain guide embodiment of the present invention in an engine between the crankshaft and one camshaft.

FIG. 3 is a sectional view of the guide bracket and wear face of the present invention illustrating the shape of the bracket and wear face along line 3—3 in FIG. 2.

FIG. 4 is a side view of the bracket of the present invention.

FIG. 5 is a bottom view of the bracket of FIG. 4.

FIG. 6 is a cross sectional view of the bracket of FIG. 4 along line 6—6 showing the tab.

DETAILED DESCRIPTION OF THE PREFERRED EMBODIMENTS

Figure 7:
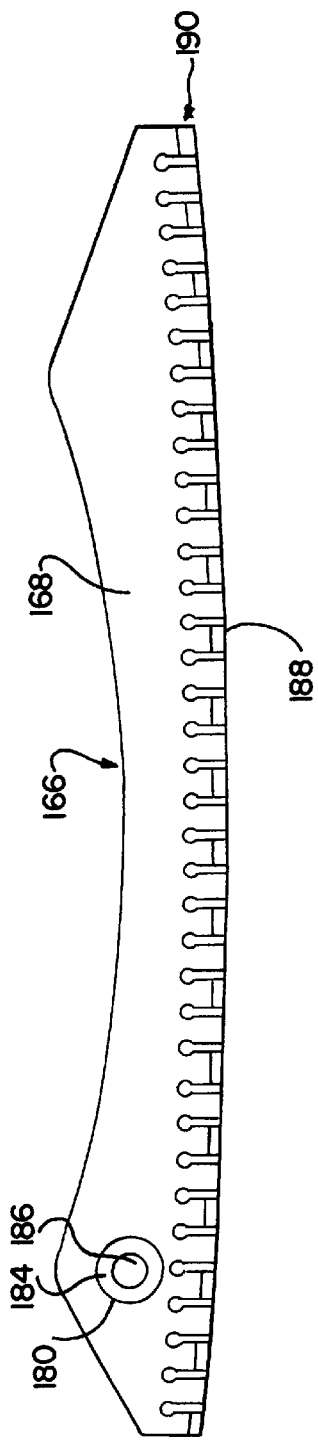
FIG. 7 is a side view of another embodiment of the bracket of the present invention.

Turning now to the drawings, FIG. 2 depicts two embodiments of the present invention as used in a representation of an engine timing system. The illustration shows only a single bank of an engine timing system.

The engine timing system includes chain 30, chain tensioner system 32 and chain guide 34. The engine chain 30 extends from the sprocket 36 mounted on the crankshaft 38 to the sprocket 40 mounted on the camshaft 42 in an endless loop. The movement of the crankshaft 38 causes the camshaft 42 to rotate.

The crankshaft sprocket 36 is the driving sprocket and thus the tight side 44 of the chain 30 is formed between the links entering the crankshaft sprocket 36 and leaving camshaft sprocket 40. The slack side 46 is the opposite side of the chain 30 between the two sprockets 36, 40.

The slack side 46 has a chain tensioner arm 32 and an actuator 50, which may be a hydraulic tensioner or the like, to apply a force to the chain tensioner arm 32. The tensioning arm and actuator are designed to act together to maintain the tension on the slack side 46 of the chain. The tight side 44 of the chain 30 has a chain guide 34 to keep the chain in position. The chain guide 34 is positioned so that its bottom side 48 is against the underside of the chain 30. The chain 30 is forced into motion by the sprockets, resulting in its movement across the bottom of the chain guide. The chain tensioner arm 32 used in the chain tensioner system and chain guide 34 will be discussed in more detail below.

FIG. 3 depicts a cross section view of the chain guide 34 of the present invention having alternating tabs 60A, 60B for engaging a tensioner shoe 62 in use with a power transmission chain 30. The chain guide 34 is mounted to the engine block 64 by a guide bracket 66. The bracket has tabs 60A, 60B which are bent in an alternating manner perpendicular to the main body 68 of the bracket 66. The plastic tensioner shoe 62 has a top side 72 with tabs 74A, 74B for engaging tabs 60A, 60B of the bracket 66. Essentially, the tabs 74A, 74B on the tensioner shoe 62 form a channel into which the bottom portion of the bracket including the tabs may be inserted. Thus, the shoe 62 is retained in position on the bracket 66.

Figure 8:
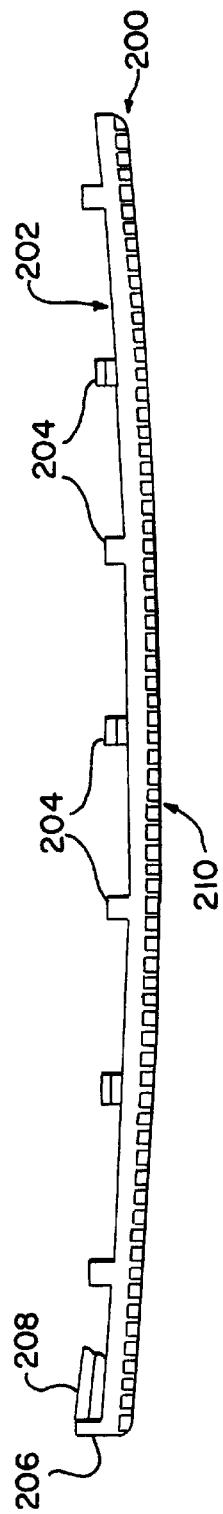
FIG. 8 is a side view of a shoe shown oriented to fit to the bracket of FIG. 7.
Figure 9:
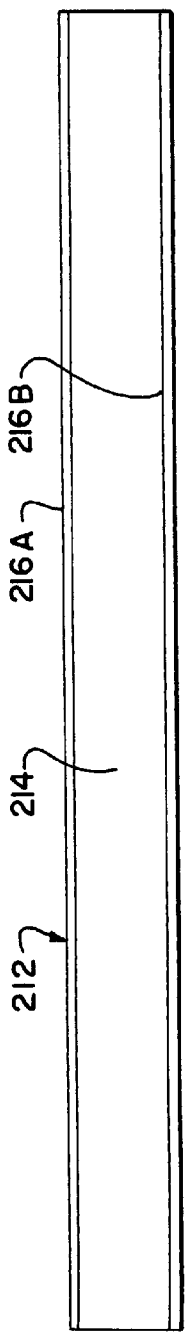
FIG. 9 is a bottom view of the wear face of the shoe of FIG. 8.

The bottom side of the shoe 62 has a wear face 76 located thereon. The chain is positioned so that it runs across the wear face and is engaged and guided thereby. The wear face includes side rails 70A, 70B which are raised to help the chain maintain its position on the guide. The side rails are also shown in FIGS. 8 and 9. The bracket and tabs are shown in more detail in FIGS. 4–6.

As shown in FIG. 3, the bracket of the present invention is mounted to the engine block so that the chain is essentially centered over the main body of the bracket. The use of alternating tabs permits the centering of the chain over the main body of the bracket. By centering the chain, the torque or moment about the bracket main body is reduced, which permits use of a thinner main body formed of sheet metal.

FIG. 4 depicts the bracket 66 or carrier of the present invention. The main body 68 of the bracket 66 has a generally flat, elongated shape. A pair of spaced apart holes 80, 82 are formed in the bracket. When the bracket is being used as part of a chain guide, both holes may be used to rigidly mount the bracket to the engine or a similar mounting element.

The bottom edge 88 of the bracket 66 has a slight camber to match a curved length of chain. Extending along the entire length of the bottom edge 88 of the main body 68 is a row or series of tabs 90. When the bracket 66 is first formed, by stamping for example, the tabs 90 are coplanar with the main body 68. A subsequent manufacturing step causes the tabs 90 to be bent perpendicular to the plane of the main body portion 68 of the bracket 66 in an alternating manner. In other words, a first tab 90A formed at one end of the bracket edge may be bent to a first side of the bracket perpendicular to the main body portion of the bracket. The following, or next tab 90B would be bent to the opposite side or second side. A third tab 90C would be bent to the first side, and so on.

The alternate pattern of the orientation of the tabs 90 is shown in FIG. 5. FIG. 5 depicts the tabs 90 on the bottom edge of the bracket 66. The tabs 90 are bent perpendicular to the main body of the bracket and form a flat surface for mounting a plastic tensioner or guide shoe.

FIG. 6 is a cross sectional view of the bracket 66 of FIG. 4. In this view the main body portion 68 of the bracket 6 has a left-facing tab 90B. Adjacent tabs (not shown) would be right facing. Thus, a flat surface is formed along the bottom edge of the bracket to fit a plastic shoe thereto.

FIG. 7 depicts an alternate embodiment of the present invention. The bracket 166 may have a pair of spaced holes as in the previous embodiment. However, only a single hole is required. The hole 180 is provided with a bushing 184. The bracket 166 is pivotally mounted to a pivot pin 186 by way of the bushing 184. Thus, the bracket 166, when combined with a plastic shoe, may be used as a tensioner arm as shown in FIG. 2. As described in FIGS. 4 and 5, the bracket has a row of tabs 190 along the bottom edge 188 of the main body portion 168 of the bracket 166. The bottom edge 188 of the bracket 166 has a slight camber to match a curved length of chain. The tabs 190 are bent perpendicular to the plane of the bracket body in an alternating manner to form a flat shoe mounting surface 188 which is the same surface as the edge. As in the above embodiment, the shoe mounting surface 188 is centered with respect to the body portion 168 of the bracket 166.

FIG. 8 depicts a plastic guide shoe or tensioner shoe 200 adapted for use with the bracket 166 shown in FIGS. 4 and 7. The shoe has an elongated flat shape which has a slight camber to match that of the bottom surface of the bracket 166. The top side 202 of the shoe has a plurality of tabs 204 which, in effect, form a C-shaped groove into which the tabs 190 of the bracket 166 are inserted. The tabs 204 of the shoe 200 hold the shoe onto the bracket 166. At one end of the shoe 200 an end wall 206 is formed which prevents the shoe 200 from sliding off of the bracket. A retaining hook 208 acts to prevent the shoe from sliding off of the bracket in the reverse direction by hooking one of the bracket tabs 190.

The bottom surface 210 of the shoe 200 contains a wear face 212 described in more detail in FIG. 9. The wear face 212 includes a sliding surface 214 and a pair of side walls 216A, 216B. The chain moves across the sliding surface 214 of the wear face 212 and is retained in place by the side walls 216A, 216B.

Figure 10:
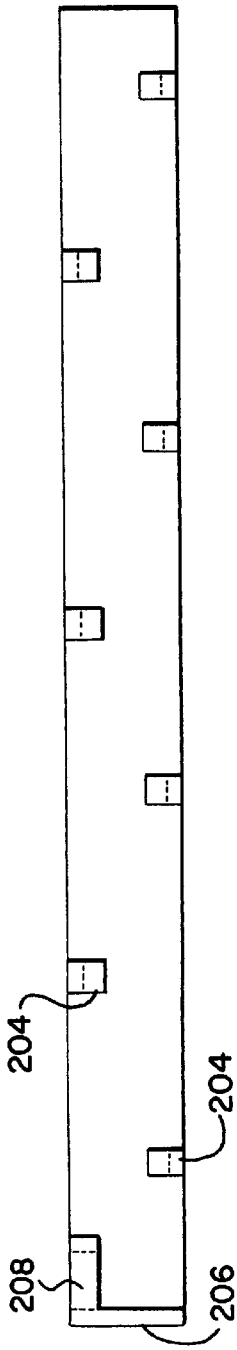
FIG. 10 is a top view of the shoe of FIG. 8 showing the bracket engaging tabs.

FIG. 10 depicts the top surface 202 of the shoe 200. The plurality of shoe tabs 204 extend inwardly from the outside edges of the shoe 200. The end wall 206 is positioned at one end of the top surface 202. The retaining hook 208 extends from the end wall 206 and is positioned to clip a tab of the bracket and prevent movement in the reverse direction or disengaging of the shoe from the bracket.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain guide for guiding a chain between a pair of sprockets in an engine timing system, said guide comprising:
   a bracket portion and an attached shoe portion, said bracket portion having a generally flat, elongated main body portion with a pair of spaced mounting holes formed therein for fixing said bracket to an associated engine; said main body portion having a longitudinal edge;
   a row of tabs formed along the entire length of said longitudinal edge, said row of tabs being bent perpendicular to said main body portion, some of said tabs being bent in a first direction and other of said tabs being bent in an opposite direction, said tabs of said first direction being alternated with said tabs of said opposite direction; said main body portion being substantially centered with respect to said row of alternating tabs;
   said shoe portion having a first side attached to said tabs and a second side adapted to contact and guide a tight strand portion of an associated chain.

2. The chain guide of claim 1 wherein said engine has a pivot pin fixed thereon, said chain guide being rotatably mounted to said pivot pin by one of said pair of spaced mounting holes, said chain guide being positioned to contact and tension a slack strand portion of said chain in combination with a tensioner.

3. A power transmission chain and guide system for an engine comprising:
   a plurality of sprockets including at least one driving sprocket connected to a power input and at least one driven sprocket connected to a power output;
   a chain assembled of interleaved links, said chain wrapped around said plurality of sprockets, said chain including at least one tight strand portion and at least one slack strand portion;
   a chain guide located along said tight strand portion, said guide including a bracket portion and an attached shoe portion;
   said bracket portion having a generally flat, elongated main body portion with a pair of spaced mounting holes formed therein for fixing said bracket portion to an associated engine, said main body portion having a longitudinal edge with a row of tabs formed thereon, said row of tabs being bent perpendicular to said main body portion, some of said tabs being bent in a first direction and other of said tabs being bent in an opposite direction;
   said shoe portion having a first side attached to said tabs and a second side adapted to contact and guide said tight strand portion of said chain.

4. The power transmission chain and chain guide system of claim 3 further comprising:
   a tensioner arm located along said slack strand portion, said tensioner arm including a bracket portion and an attached shoe portion;
   said bracket portion of said tensioner arm having a generally flat, elongated main body portion, said main body portion including a mounting hole formed therein, said main body portion having a longitudinal edge with a row of tabs formed thereon, said row of tabs being bent perpendicular to said main body portion, some of said tabs being bent in a first direction and other of said tabs being bent in an opposite direction;
   said shoe portion having a first side attached to said tabs and a second side adapted to contact said slack strand portion of said chain;
   a pivot pin fixed to said engine; said tensioner arm being rotatably mounted to said fixed pivot pin about said mounting hole in said bracket.

5. The power transmission chain and guide system of claim 3 wherein said tabs bent in said first direction are alternated with said tabs bent in said opposite direction.

6. The power transmission chain and guide system of claim 5 wherein said tabs are formed in said alternating manner along the entire length of said longitudinal edge of said main body portion.

7. The power transmission chain and guide system of claim 5 wherein said main body portion is substantially centered with respect to said row of alternating tabs.

* * * * *